April 25, 1939. N. E. ERICKSON 2,155,702
TRACTOR FENDER
Filed April 30, 1938
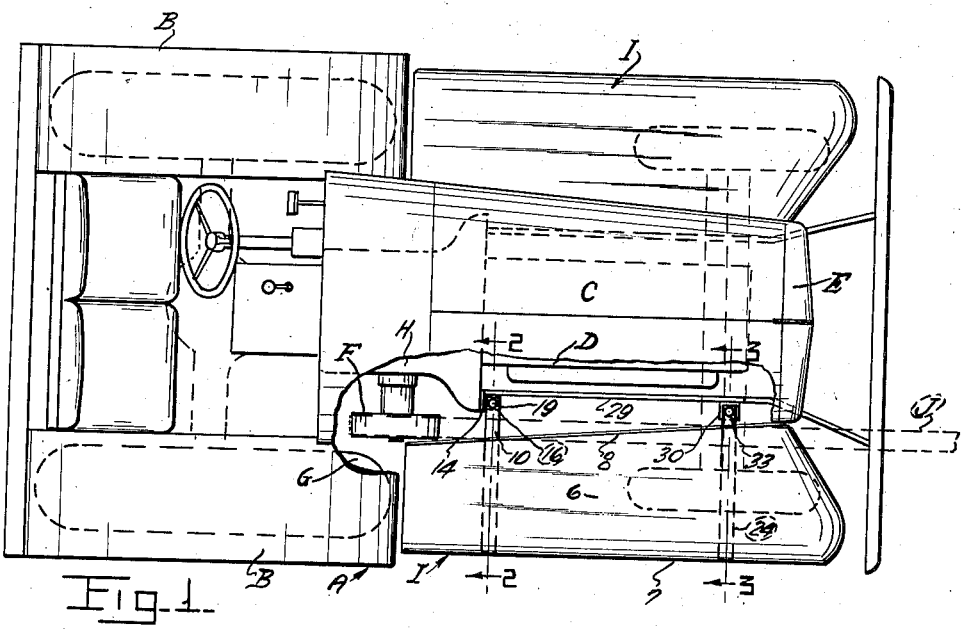
INVENTOR.
NELS E. ERICKSON
BY Andrew E. Carlsen
ATTORNEY.

Patented Apr. 25, 1939

2,155,702

UNITED STATES PATENT OFFICE 2,155,702

TRACTOR FENDER

Nels E. Erickson, Minneapolis, Minn., assignor to Minneapolis-Moline Power Implement Company, Minneapolis, Minn., a corporation of Delaware Application April 30, 1938, Serial No. 205,268

8 Claims. (Cl. 280—152)

This invention relates to improvements in tractor fenders and mountings therefor. In certain types of tractors the front wheel fender on the side of the tractor at which the power take-off pulley is located, must be removed in order to permit the pulley to be reached for placing a belt thereon. Heretofore this removal of the fender has been a laborous task due to the fact that the bolts mounting the fender on the tractor were located underneath the fender and then were very hard to reach for removal and replacement. It is the primary object of my invention, therefore, to provide a fender mounting means which may be readily manipulated from the top of the fender so that the fender may be removed without difficulty.

Another object is to provide a fender mounting means in which a single mounting bolt is employed and in which the bolt is inserted downwardly from the top of the fender so that it is at all times exposed for convenient removal and replacement. Ordinarily two, or more, fender mountings will be used for the fender and will be disposed adjacent the ends thereof.

A further object is to provide a fender mounting assembly in which the fender itself, which is usually pressed from light sheet material, is provided with a bracket member having inwardly turned and vertically spaced ends which are adapted to embrace and rest on ears or lugs extended from the tractor frame or engine. These bracket ends, and their supporting ears or lugs, are then provided with aligned vertically extended bores through which a long fastening bolt may be inserted so that its head is exposed above the bracket. The lowermost bracket end is tapped to receive the lower end of the bolt so that it is only necessary to unscrew the bolt and lift it upwardly to free the fender.

Still a further object is to provide, as a modification of the above assembly, a mounting means in which the supporting member for the fender bracket is slotted to receive the mounting bolt or bolts so that these bolts need not be removed but may instead be simply loosened to free the fender from the support.

The foregoing and other objects, together with means whereby the same may be carried into effect, will best be understood from the following detailed specification, reference being had to the accompanying drawing, wherein:

Fig. 1 is a plan view of a tractor showing a fender mounted thereon in accordance with my invention, and with parts of the tractor broken away to better disclose the assembly.

Fig. 2 is an enlarged cross section along the line 2—2 in Fig. 1.

Fig. 3 is an enlarged cross section along the line 3—3 in Fig. 1.

Fig. 4 is a cross sectional view similar to Fig. 2, but showing a modified form of fender mounting assembly.

Fig. 5 is a further enlarged and fragmentary plan view of the mounting assembly illustrated in Fig. 4.

Referring now more particularly and by reference characters to the drawing, A designates a conventional type of tractor including the rear fenders B, the forwardly extending hood C enclosing the engine D, and the radiator E. The power take-off pulley F is located between the right rear wheel G and the transmission housing H. The fenders I are arranged alongside the hood C and extend forwardly from the rear fenders B over the front wheels of the tractor and to a point adjacent the radiator E. The front fenders are thus necessarily so located that they must be removed in order to permit a belt, such as indicated at J, to be placed over the pulley F.

In accordance with my invention, the right fender I is arranged to be readily removable, as will now be described. The fender is conventionally formed or pressed from sheet metal to provide the relatively flat upper surface 6 and the downwardly turned and rounded outer and frontal edges 7. The inner edge 8 is angularly extended to conform to the forward taper of the hood C, against the side of which this edge 8 will fit when the fender is in place.

A rear mountining assembly, designated generally at 9, is provided, and the same comprises an upper arm 10 of angle iron, welded or otherwise secured crosswise to the underside of the fender and extended downwardly inside of the outer edge 7 thereof. A lower arm 11, also of angle iron, is welded at 12 to the lower extremity of the arm 10 and extends inwardly therefrom. A diagonally extended brace 13 connects the inner and outer ends of the upper arm 10, as shown. The foregoing arrangement is such that the inner ends of the arms 10 and 11 are extended in parallelism and in vertically spaced relationship inwardly from the fender to provide supports therefor.

A bracket 14 is secured, as by bolts 15, to the frontal part of the transmission housing H, and this bracket has vertically spaced mounting lugs or ears 16 which may fit nicely between the inner ends of the arms 10 and 11 when said arms are slipped inwardly over the lugs. The said inner ends of these arms 10 and 11, and the lugs 16, are all provided with aligned and vertically extended bolt apertures designated generally at 17, and which will receive the mounting bolt 18 when same is inserted downwardly therethrough. The head 19 of the bolt 18 will thus rest on the upper supporting arm 10, and the lower end of the bolt is threaded to screw into a bored and tapped block 20 which is welded to the lower face of the supporting arm 11. To facilitate the insertion of the bolt 18 downwardly through the apertures 17, its lower end is tapered, as shown at 21. Also to facilitate the placement of the arms 10 and 11 over the lugs 16 the inner ends of the arms are spread angularly apart as designated at 22.

A front mounting assembly, designated generally at 23, is provided, and the same comprises an upper arm 24 welded, or otherwise secured crosswise to the underside of the fender I near its frontal end, and with the outer end of the arm turned downwardly within the outer rolled edge of the fender. The lower mounting arm 25 is secured at 26 to the upper arm some distance from its outer end, and this lower arm inclines downwardly and inwardly from its point of attachment. A brace bar 27 is welded vertically between the arms 24 and 25 adjacent their inner ends and serves to rigidly support these inner ends in vertically spaced relationship to thereby act as supports for the fender, as will appear.

A bracket 28 is welded or suitably secured to a bar 29 which extends alongside the tractor engine D, and this bracket has outwardly turned and vertically spaced ears 30 which are adapted to fit between the inner ends of the mounting arms 24 and 25. These inner ends of the arms 24 and 25, together with the ears 30 of the bracket 28, have aligned and vertically extended apertures 31 through which the long mounting bolt 32 may be inserted. The head 33 of the bolt bears against the upper mounting arm 24, while its lower end is threaded to screw in a bored and tapped block 34 which is welded to the lower arm 25. The lower end of the bolt 32 is tapered, as at 35, to facilitate its insertion downwardly through the apertures 31, and the outer extremities of the bracket ears 30 are bent inwardly toward each other, as designated at 36, to make it easier to slip the supporting arms 24 and 25 over the ears in mounting the fender.

In use the fender I is mounted as described, and may be rigidly supported by screwing the bolts 18 and 32 tight. However, by simply loosening and removing these two bolts the fender may be readily detached from the tractor, and the pulley F' will thus be exposed for connection of the take-off belt thereto. Inasmuch as the heads 19 and 33 of the bolts are exposed above the fender, the operations of removing or replacing the bolts and fender are thus greatly facilitated. It is, of course, apparent that the particular mounting arrangement used for the supporting brackets will vary according to the type of tractor, the connection of the fender to the engine or tractor frame, and other factors, and such variations are considered to be within the scope of my invention.

The mounting assembly as herein shown and described may be used for both right and left fenders of the tractor if so desired, especially since the assembly provides a rigid and durable mounting, and both fenders would thus be readily removable for repair or replacement or to allow more convenient access to steering gear and other parts.

Referring more particularly to Figs. 4 and 5, I have shown therein a modified form of my mounting assembly, wherein the fender mounting arm 37 is welded crosswise to the underside of the fender I', and has a diagonal brace bar 38 which is extended between the inner and lower ends of the arm and welded thereto. The arm 37 is made of angle iron, and has its horizontally disposed web or side 37$^a$ provided with spaced mounting bolts 39 and 40 which are screwed into a bored and tapped block or plate 41 welded beneath the web. These bolts 39 and 40 are spaced apart along the length of the inner exposed end of the arm 37, and are provided with large washers 42 beneath their heads 43.

The mounting bracket 44 here takes the form of a short length of angle iron which is extended laterally from the tractor or engine, and is supported in position by the supporting angle 45 and gusset plate 46. The bracket has the horizontally disposed web or member 44$^a$ beneath which the inner end of the arm 37 may be placed, and this web 44$^a$ has elongated notches 47 and 48 which open outwardly through one edge to receive the mounting bolts 39 and 40. These bolts may thus be screwed tight against the bracket web 44$^a$, with the washers 42 bearing thereagainst to rigidly secure the fender in place on the bracket. However, by slightly loosening the bolts they may be slipped out of the notches 47 and 48 and the fender may thus be readily removed. The heads of the bolts are again exposed above the fender for convenient manipulation in the process of removing and replacing the fender, and the construction is further such that the bolts need not be removed from the fender, but only loosened sufficiently to slip from the notches.

It is understood that I may vary from the specific structural details as herein set forth, so long as such variations fall within the spirit and scope of the appended claims.

Having thus fully disclosed my invention, what I claim as new and desire to secure by Letters Patent is:

1. A mounting device for a tractor fender comprising, a bracket secured to the tractor and including vertically spaced supporting ears, vertically spaced arms secured to the fender and extended inwardly therefrom in overlapping engagement with the supporting ears the inner ends of the arms being flared apart for guiding the arms into engagement with the said ears, the said ears and arms having vertically aligned apertures, and a single mounting bolt extended vertically through the apertures for securing the arms in the ears.

2. A mounting device for a tractor fender comprising, a bracket secured to the tractor and including vertically spaced supporting ears, vertically spaced and diagonally braced arms secured to the fender and extended inwardly therefrom in overlapping engagement with the supporting ears, the said ears and arms having vertically aligned apertures, a single mounting bolt extended vertically through the apertures for securing the arms in the ears, and the heads of the bolts being upwardly disposed for manipulation above the fender and the lower ends of the bolts having threaded engagement with the connected parts.

3. A mounting device for a tractor fender comprising, a bracket member secured to the tractor and including vertically spaced ears having vertically aligned and axised apertures, an arm assembly secured to the fender and including vertically spaced and inwardly extended supporting elements for embracing and overlapping the said ears, the said supporting elements having apertures aligned vertically with the said apertures in the ears, a single mounting bolt extended vertically through the aligned apertures and with its head upwardly disposed, and the lowermost end of the bolt having releasable threaded engagement with the supporting element thereat, and means for guiding the arms into overlapping engagement with the said ears.

4. A mounting device for a tractor fender comprising, a supporting member extended from the tractor and having spaced notches opening through one edge, an arm extended from the fender for engagement with the supporting member, and bolts threaded vertically in the arm and adapted to enter the said notches, and the heads of the bolts being upwardly disposed for releasable engagement with the mounting member around the notches.

5. A device for mounting a fender alongside a tractor, comprising a bracket member secured to the side of the tractor and having a supporting portion extending laterally outwardly from the tractor frame, an arm secured crosswise to the underside of the fender and extended horizontally at one end clear of the inner margin of the fender and adapted at its inner end to engage the supporting portion of the bracket, and a screw extended vertically through the bracket and arm, and having its headed end disposed above the arm and inwardly of the fender.

6. A mounting device for a vehicle fender, comprising a bracket member secured to the vehicle and having vertically spaced mounting lugs, an arm assembly secured to the fender and including vertically spaced upper and lower arms, the upper arm being adapted to overlie the upper lug while the lower arm fits beneath the lower lug, the said arms and lugs having registering, vertically axised apertures, a screw extended through the said apertures, with its headed end disposed upwardly and exposed on the upper arm, and the lower end of the screw having releasable threaded engagement with the lower arm.

7. A mounting device for a vehicle fender, comprising a bracket member secured to the vehicle and having vertically spaced mounting lugs, an arm assembly secured to the fender and including vertically spaced upper and lower arms, the said upper arm adapted to overlie the upper lug while the lower arm fits beneath the lower lug, the said arms and lugs having registering, vertically axised apertures, a screw extended through the said apertures, with its headed end disposed upwardly and exposed on the upper arm, the lower end of the screw having releasable threaded engagement with the lower arm, the upper arm having its extremity turned upwardly and the lower arm having its extremity turned downwardly for guiding the arms into overlapping engagement with the said lugs.

8. A mounting device for a vehicle fender, comprising a bracket member secured to the side of the vehicle and extending laterally therefrom, the said bracket member having spaced notches opening out through one edge, an arm secured to the fender and adapted to fit against the bracket member, and screws threaded in the said arm and spaced apart to enter the said notches and secure the arm to the bracket member, the headed ends of the screws being exposed for convenient removal.

NELS E. ERICKSON.